(12) United States Patent
Ruckdeschel et al.

(10) Patent No.: US 9,463,767 B2
(45) Date of Patent: Oct. 11, 2016

(54) BURSTING DIAPHRAGM, ESPECIALLY FOR AN INFLATOR, INFLATOR, AIRBAG MODULE AND VEHICLE SAFETY SYSTEM

(71) Applicant: TRW Airbag Systems GmbH, Aschau am Inn (DE)

(72) Inventors: Rolf Ruckdeschel, Heldenstein (DE); Lorenz Seidl, Rechtmehring (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 14/478,289

(22) Filed: Sep. 5, 2014

(65) Prior Publication Data

US 2015/0158455 A1 Jun. 11, 2015

(30) Foreign Application Priority Data

Nov. 12, 2013 (DE) ........................ 10 2013 018 886

(51) Int. Cl.
*B60R 21/264* (2006.01)
*B60R 21/272* (2006.01)
*B60R 21/274* (2011.01)
*C06D 5/00* (2006.01)
*B60R 21/26* (2011.01)

(52) U.S. Cl.
CPC ........... *B60R 21/274* (2013.01); *B60R 21/264* (2013.01); *B60R 21/272* (2013.01); *C06D 5/00* (2013.01); *B60R 2021/26052* (2013.01); *Y10T 137/1714* (2015.04)

(58) Field of Classification Search
CPC . B60R 21/264; B60R 21/272; B60R 21/274; B60R 2021/26052; B60R 21/2725; C06D 5/00; Y10T 137/1714
USPC ....................................................... 280/737
See application file for complete search history.

(56) References Cited

U.S. PATENT DOCUMENTS

| | | | | |
|---|---|---|---|---|
| 3,445,032 A | * | 5/1969 | Hansen | F16K 17/162 137/68.25 |
| 3,484,817 A | * | 12/1969 | Wood | 220/89.2 |
| 3,881,629 A | * | 5/1975 | Shaw | F16K 17/162 137/68.27 |
| 4,289,327 A | * | 9/1981 | Okada | B60R 21/268 137/69 |
| 4,905,722 A | * | 3/1990 | Rooker | B23Q 16/026 137/68.24 |
| 5,482,075 A | * | 1/1996 | Farwell | F16K 17/16 137/68.11 |
| 5,564,743 A | * | 10/1996 | Marchant | 280/741 |
| 5,603,525 A | * | 2/1997 | Zakula | 280/737 |
| 5,615,912 A | * | 4/1997 | O'Loughlin et al. | 280/737 |
| 5,762,368 A | * | 6/1998 | Faigle et al. | 280/737 |
| 5,897,136 A | * | 4/1999 | Okada | 280/737 |
| 6,062,599 A | * | 5/2000 | Forbes et al. | 280/737 |
| 6,116,642 A | * | 9/2000 | Shirk et al. | 280/737 |
| 6,168,201 B1 | * | 1/2001 | Takeyama et al. | 280/737 |
| 6,168,202 B1 | * | 1/2001 | Stevens | 280/737 |
| 6,328,336 B1 | * | 12/2001 | Takahashi et al. | 280/737 |

(Continued)

FOREIGN PATENT DOCUMENTS

DE 102007002374 7/2008
DE 102011009309 7/2012

*Primary Examiner* — Laura Freedman
(74) *Attorney, Agent, or Firm* — Tarolli, Sundheim, Covell & Tummino LLP

(57) ABSTRACT

The invention relates to a bursting diaphragm (14) for an inflator (10) comprising at least one predetermined breaking contour (24) destroyable upon activation of the inflator (10), wherein a shock wave can be generated. In accordance with the invention, the predetermined breaking contour (24) includes a through hole (25) on at least one end point (27), especially on all end points (27).

19 Claims, 3 Drawing Sheets

(56) References Cited

U.S. PATENT DOCUMENTS

| | | | |
|---|---|---|---|
| 6,357,792 B1* | 3/2002 | Shirk et al. | 280/737 |
| 6,382,668 B1 | 5/2002 | Goetz | |
| 6,540,257 B2* | 4/2003 | Magoteaux | 280/739 |
| 6,769,714 B2* | 8/2004 | Hosey et al. | 280/737 |
| 6,786,507 B2* | 9/2004 | Dolling et al. | 280/737 |
| 7,360,788 B2* | 4/2008 | Yano et al. | 280/737 |
| 7,520,531 B2* | 4/2009 | Gammill | 280/737 |
| 7,607,688 B2* | 10/2009 | Kato et al. | 280/737 |
| 8,186,712 B1* | 5/2012 | Stevens | 280/737 |
| 8,322,360 B2* | 12/2012 | Wilson | B65D 90/36 137/68.19 |
| 8,636,164 B2* | 1/2014 | Hernandez | 220/89.2 |
| 8,651,520 B2 | 2/2014 | Jung et al. | |
| 2005/0146123 A1* | 7/2005 | Bergmann et al. | 280/741 |
| 2005/0189750 A1 | 9/2005 | Gotoh et al. | |
| 2005/0206145 A1 | 9/2005 | Kato et al. | |
| 2005/0236821 A1* | 10/2005 | Hofmann et al. | 280/737 |
| 2007/0158934 A1* | 7/2007 | Lee et al. | 280/737 |
| 2008/0111358 A1* | 5/2008 | Jackson et al. | 280/741 |
| 2008/0169630 A1 | 7/2008 | Herget et al. | |
| 2010/0127486 A1* | 5/2010 | Asanuma | 280/737 |
| 2012/0187667 A1* | 7/2012 | Jung et al. | 280/737 |
| 2013/0255523 A1* | 10/2013 | Naud | F42B 4/06 102/357 |

\* cited by examiner

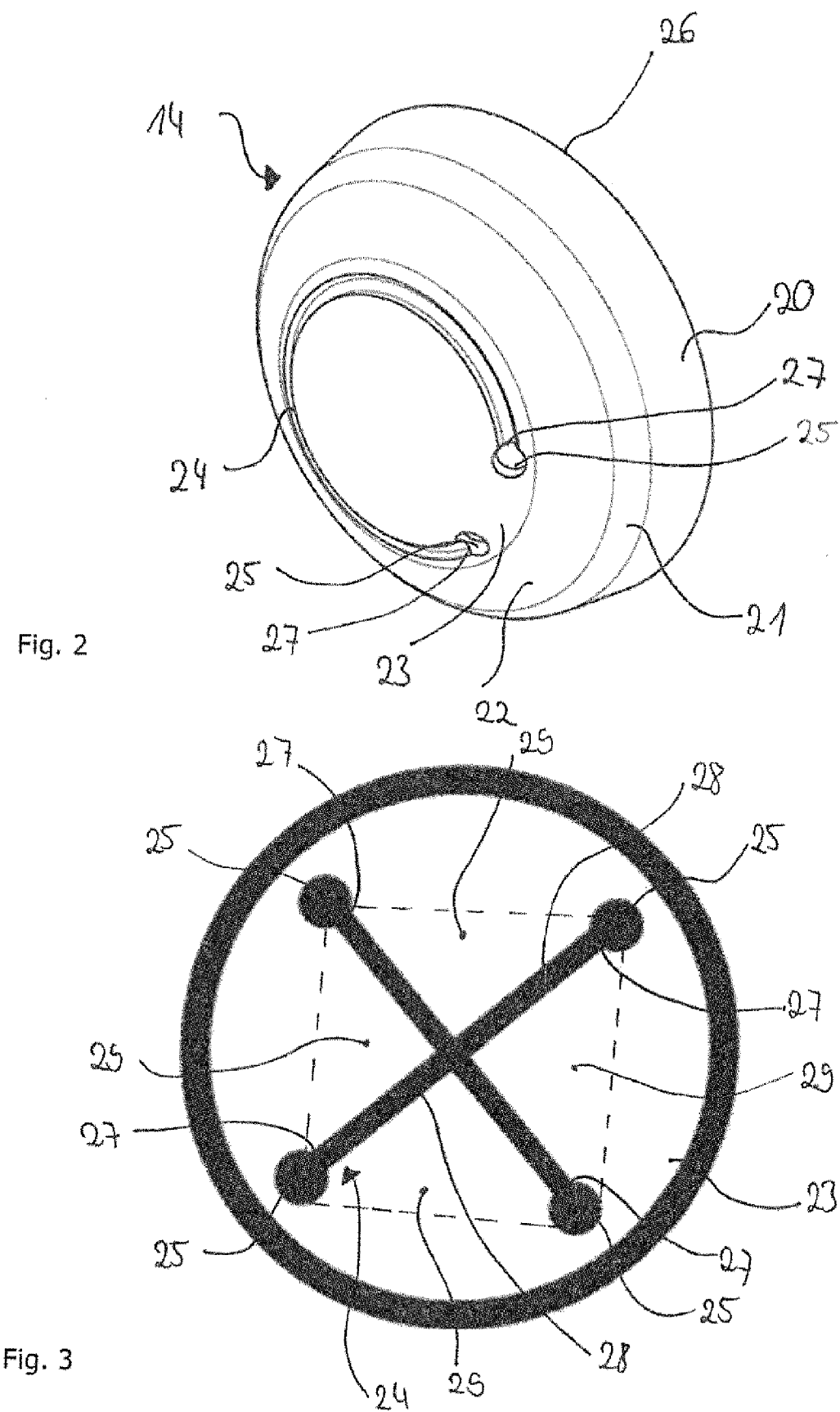

BURSTING DIAPHRAGM, ESPECIALLY FOR AN INFLATOR, INFLATOR, AIRBAG MODULE AND VEHICLE SAFETY SYSTEM

BACKGROUND OF THE INVENTION

The invention relates to a bursting diaphragm, especially for an inflator, comprising at least one predetermined breaking contour destroyable upon activation of the inflator, wherein a shock wave can be generated. Apart from that, the invention relates to an inflator, an airbag module as well as a vehicle safety system.

Inflators supply gas for filling an airbag or for driving a belt tensioner, for example. In both cases it is important that the generated gas is quickly available. According to a known technology, this gas is generated at least partly of a pressurized gas stored in the housing of the inflator. A membrane closes the housing in which the pressurized gas is stored in a fluid-tight manner. The housing is opened in that upon activation of the inflator a pyrotechnic igniter destroys the membrane so that the gas can flow out.

Such inflator is known, for example, from the laid-open print 2005/0206145 A1. This inflator includes a combustion chamber in which an igniter adapted to be activated while pressure is developed is accommodated. Moreover a supply chamber filled with compressed gas is provided which is closed in a pressure-tight manner in the non-activated state of the inflator against the combustion chamber by a breakable membrane. The breakable membrane includes a weakened zone which is destroyable upon activation of the inflator so as to provide a fluid communication between the combustion chamber and the supply chamber filled with compressed gas upon activation of the inflator.

SUMMARY OF THE INVENTION

It is the object of the present invention to further develop such membrane. Moreover it is the object of the invention to describe an inflator, an airbag module as well as a vehicle safety system comprising such membrane.

In accordance with the invention, this object is achieved with respect to the further developed bursting diaphragm by the subject matter of claim 1.

The invention is thus based on the idea to describe a bursting diaphragm, especially for an inflator, comprising at least one predetermined breaking contour destroyable upon activation of the inflator, wherein a shock wave can be generated, the predetermined breaking contour having a through hole on at least one end point, especially on all end points.

A predetermined breaking contour preferably has at least two end points, the end points describing for example the end areas of linear or curved geometries. The predetermined breaking contour has a through hole on at least one end point, especially on all end points. The advantage of the bursting diaphragm according to the invention consists in the fact that the through hole or through holes in the bursting disk allow to dispense with a pressure-tight design of the bursting disk. This is to say that the bursting disk need not be fastened in a complicated pressure-tight manner to the housing of the inflator, as it constitutes no pressure-tight closing-off for pressurized gas inside the inflator. Moreover, the through hole or through holes in the bursting diaphragm offer the option to store a larger amount of pressurized gas in an inflator, as, apart from a pure pressure storage chamber provided on one side of the bursting diaphragm, on the other (opposite) side of the bursting diaphragm, for instance in a combustion chamber containing pyrotechnic propellant, further space can be used for additional storage of pressurized gas.

The predetermined breaking contour is destroyed upon activation of the inflator and the bursting diaphragm ruptures along the predetermined breaking contour, wherein a shock wave is generated, as will be described in more detail further below. In order to allow destruction and generation of a shock wave the predetermined breaking contour is designed to be C-shaped and/or double C-shaped and/or H-shaped and/or T-shaped and/or star-shaped and/or circle segment-shaped and/or cross-shaped.

The bursting diaphragm can have an outer contour which is cap-shaped and/or semicircular. The contour of the shell surface of the bursting diaphragm is referred to as outer contour of the bursting diaphragm. In other words, the bursting diaphragm can take the shape of a cap having a semicircular lid including an adjacent frusto-conical or cylindrical circumferential wall. Moreover it is possible that the bursting diaphragm has a frusto-conical or cylindrical circumferential wall, wherein the lid merely has a flat bulge. Also the formation of a flat lid is possible.

The through hole of the predetermined breaking contour can be circular. The through hole has at least one opening width, especially having a diameter of from 0.5 to 3.00 mm, especially of from 1.0 to 2.5 mm, especially of from 1.2 to 2.0 mm, especially of 1.4 mm. If the through hole is circular, the opening width can be referred to as diameter.

Preferably the shell surface of the bursting diaphragm has a uniform material thickness. In other words, the shell surface of the bursting diaphragm can exhibit the same material thickness continuously and on the entire shell surface, respectively.

The predetermined breaking contour of the bursting diaphragm is preferably incorporated in the lid of the shell surface of the bursting diaphragm which can be semicircular and/or bulged and/or flat. The predetermined breaking contour can be formed by stampings and/or millings and/or notches and/or laser abrasions. The predetermined breaking contour forms a weakened zone of the bursting diaphragm so that the shown types of the possible configurations of the predetermined breaking contour are appropriate methods by which an opening force to be appropriately reproduced and thus the bursting pressure can be precisely adjusted, for example via the number and the depth of the different areas of the stampings and/or millings and/or notches and/or laser abrasions.

The stampings and/or millings and/or notches and/or laser abrasions preferably have a smaller material thickness than that of the shell surface and do not rupture such shell surface.

As regards an inflator, the object is achieved by the features of claim 7.

Such inflator according to the invention has a bursting diaphragm according to the invention. Preferably the inflator comprises at least one combustion chamber filled with fuel and gas and having a discharge end. Furthermore the inflator comprises at least one igniter unit by which the fuel can be ignited. The igniter unit can be provided, for example, in the form of a pyrotechnic igniter. The bursting diaphragm is connected to an external housing of the inflator preferably by material connection and/or form fit. A material connection of the bursting diaphragm to the external housing of the inflator can be made by adhesive bonding and/or welding, for example. A form-fit connection of the bursting diaphragm to the external housing of the inflator is made, for example, by clamping or an appropriate clamping connection.

In the inactivated or non-activated state of the inflator, i.e. in a non-ignited state, the bursting diaphragm separates the combustion chamber from a gas supply chamber. The at least one through hole of the predetermined breaking contour is configured as fluid communication or flow communication between the combustion chamber and the gas supply chamber.

Summing up, it can be stated that the inflator comprises at least one combustion chamber in which fuel, especially solid fuel, adapted to be burnt while gas is developed is accommodated. Moreover, the inflator comprises a supply chamber filled with gas, especially compressed gas, and an igniter and a bursting diaphragm arranged between the combustion chamber and the supply chamber. There is at least one flow or fluid communication between the supply chamber and the combustion chamber. The bursting diaphragm includes an additional predetermined breaking contour destroyable upon activation of the inflator, wherein a shock wave can be generated. In detail this means that by the combustion of the fuel in the combustion chamber higher pressure is built up than it is prevailing in the supply chamber filled with gas. When the burst pressure of the bursting diaphragm is reached or exceeded, the latter opens and thus ruptures along the predetermined breaking contour so as to permit an abrupt relatively large-surface pressure compensation between the built-up pressure in the combustion chamber and the gas pressure of the pre-filled supply chamber. By opening the bursting diaphragm and, resp., by this abrupt pressure compensation a shock wave is formed which runs along the longitudinal axis of the inflator through the supply chamber at high velocity so as to open a closure means, preferably a bursting disk, by local excess pressure on a front-side end of the supply chamber. After that inflating gas, especially a mixture of the gas generated by the combustion of the fuel and the gas stored in the supply chamber in a pressurized state can exit the inflator via a diffuser so as to flow into an inflatable airbag, for instance. Due to bursting of the bursting diaphragm in the activated state of the inflator, an enlarged discharge opening can be generated so that gas generated by burning the fuel can flow more quickly into the supply chamber and through the same out of the inflator. Due to the generation of the shock wave, the closure means or the bursting disk, resp., of the supply chamber can be opened more quickly than with inflators that form no shock wave in the case of function.

Moreover, it is possible to arrange a combustion chamber screen, preferably in line with the predetermined breaking contour of the bursting diaphragm and with the bursting diaphragm. A combustion chamber screen can withhold possible combustion particles which may be formed by the combustion of the fuel, especially the solid fuel.

Further it is of advantage to arrange the igniter and the bursting diaphragm and/or the combustion chamber screen and/or the predetermined breaking contour of the bursting diaphragm and/or the bursting disk on the longitudinal inflator axis. With the aid of such arrangement optimum ignition of the fuel, especially of the solid fuel, and/or the compressed gas as well as efficient formation and propagation of the shock wave and thus destruction of the bursting diaphragm and/or bursting disk is achieved. Finally, this serves for a save and quick functioning of the inflator. For example, molds pressed into tablet shape can be used as solid fuel.

The through hole has at least an opening width, especially a diameter of 0.5 to 3.00 mm, especially of 1.4 mm. The through hole has at least such opening width that for producing the inflator when the inflator is filled with gas pressure compensation between the gas supply chamber and the combustion chamber takes place in less than 15 seconds, especially in less than 10 seconds, especially in less than 8 seconds, especially in less than 5 seconds. The opening width and the diameter of the through hole, in other words, is at least so large that upon production of the inflator after build-up of the combustion chamber rapid pressure compensation from the gas supply chamber into the combustion chamber is reached, the clock cycle especially amounting to 5 seconds.

Moreover, the through hole, especially the opening width can be configured so that upon activation of the inflator an increase in pressure takes place in the combustion chamber so as to cause the bursting diaphragm to open. In other words, the opening width and, resp., the diameter of a through hole are not allowed to be configured too large so that the configuration of the shock wave and, resp., the functional opening of the bursting diaphragm is not impaired. Despite the existing through hole a significant increase in pressure must be allowed to be formed in the combustion chamber so that the bursting diaphragm can be destroyed or opened according to its function.

Summing up, the opening width and, resp., the diameter of a through hole has to be designed between two parameters having a contrary effect. These are the required pressure increase in the combustion chamber and the pressure compensation between the gas supply chamber and the combustion chamber.

It is further possible that in the inflator inside the gas supply chamber additional fuel is accommodated for re-supplying hot gas. In other words, apart from the fuel provided in the combustion chamber of the inflator, there can be further stored additional fuel in the gas supply chamber which can be ignited after opening the bursting diaphragm and/or after forming the shock wave and thus can serve as additional source for hot gas for assistant filling later in time of an inflatable airbag.

In this case the additional fuel can be provided in the gas supply chamber loosely and/or in packed or packaged form, wherein the chemical composition and/or the geometric design of the additional fuel can be different from the fuel in the combustion chamber.

Especially the additional fuel can be a fluid, in particular a gaseous ignitable fuel.

As regards an airbag module, the object is achieved by the features of claim 13. Accordingly, an airbag module includes a bursting diaphragm according to the invention and/or an inflator according to the invention.

As regards a vehicle safety system, the object is achieved by the features of claim 14; accordingly the vehicle safety system includes a bursting diaphragm according to the invention and/or an inflator according to the invention and/or an airbag module according to the invention. The vehicle safety system may be a vehicle occupant restraint system, for example an airbag and/or a seat belt.

BRIEF DESCRIPTION OF THE DRAWINGS

Further advantages and features of the invention are resulting from the following description of plural variants with respect to the enclosed drawing, in which:

FIG. 2 shows a perspective view of a bursting diaphragm according to the invention; and FIGS. 3 to 5 show views of predetermined breaking contours configured according to the invention.

DESCRIPTION

Figure 1:
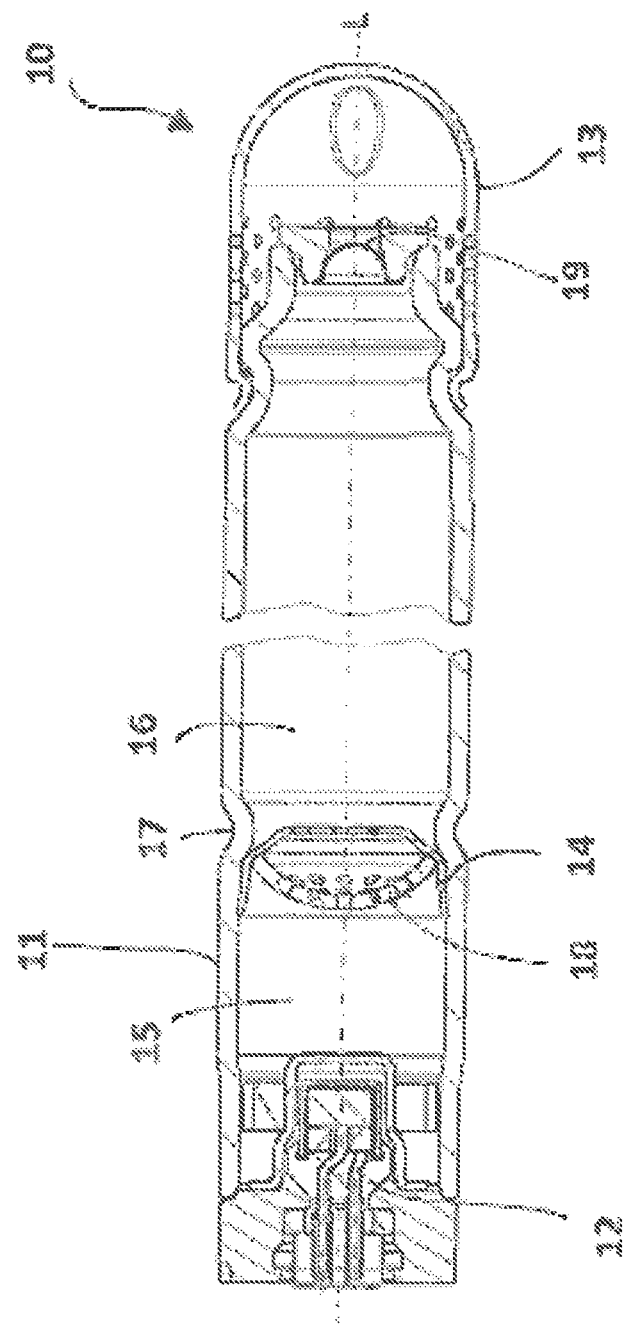
FIG. 1 shows a schematic cross-section across an inflator according to the invention.

FIG. 1 shows an inflator 10 comprising an elongate cylindrical housing 11 forming the external housing of the inflator 10 on the first axial end of which an igniter 12 is provided and on the second axial end of the housing 11 a diffuser 13 is provided. The diffuser 13 is provided with discharge orifices and is adjacent to the housing 11 in the axial direction and guides the outflowing gas to a place of action, for example an inflatable airbag not shown here.

A bursting diaphragm 14 divides the housing 11 into a combustion chamber 15 and a gas supply chamber 16. In the direction of the longitudinal inflator axis L the combustion chamber 15 is connected to the igniter 12 in the housing 11. In the combustion chamber 15 a predetermined amount of fuel not shown is provided. This fuel can be present in the form of tablets, for example.

In the direction of the longitudinal inflator axis L the supply chamber 16 is adjacent to the combustion chamber 15. The supply chamber 16 is filled with gas, especially cold gas (for instance argon, helium or an appropriate gas mixture). The bursting diaphragm 14 does not close the gas supply chamber 16 in a pressure-tight manner against the combustion chamber 15 so that a flow communication exists between the two chambers 15 and 16. For this reason, when producing the inflator 10 upon filling the gas supply chamber 16 with gas, especially cold gas, this gas flows via through holes of the bursting diaphragm 14 also into the combustion chamber 15, until pressure compensation between the two chambers 15 and 16 is reached. Preferably the pressure compensation is brought about within approx. 5 seconds. Prior to activating the inflator 10, hence compressed gas is provided both in the gas supply chamber 16 and in the combustion chamber 15 in mutual flow communication.

In the variant of the inflator according to the invention shown here, the bursting diaphragm 14 according to the invention is press-fitted or clamped in the housing 11. However, the bursting diaphragm 14 can also be connected to the housing 11 by material connection.

In the area in which the bursting diaphragm 14 is fastened in the housing 11 the latter includes an annular peripheral notch 17. To the inside of the notch 17 the outer surface of the bursting diaphragm 14 is adjacent so that the bursting diaphragm 14 is supported in the area of the notch 17 and the bursting diaphragm 14 thus is additionally secured. In case that the bursting diaphragm 14 is connected to the housing 11 by material connection, the annular peripheral notch 17 can be dispensed with, wherein the housing in this area can have an equally continuous cylindrical shape.

In order to withhold combustion particles, for instance, a combustion chamber screen 18 can be inserted ahead of the bursting diaphragm 14 in the combustion chamber 15.

Upon activation of the inflator 10, the igniter 12 receives an electric signal for activating the same or for igniting the fuel. The ignition of the fuel provided in the combustion chamber 15, especially solid fuel, results in a sudden increase in pressure in the combustion chamber 15 so that the predetermined breaking contour of the bursting diaphragm 14 not shown in FIG. 1 is destroyed or opened so that an opening, which is large related to the diameter of the housing 11, suddenly formed in the bursting diaphragm 14. This abrupt opening generates a shock wave that enters into the gas supply chamber 16 and passes through the same up to the bursting disk 19, as described in the foregoing.

In the shown embodiment of an inflator 10 according to the invention the igniter 12, the combustion chamber screen 18 and the bursting diaphragm 14 are located on the longitudinal inflator axis L. In this way optimum ignition of the fuel present in the combustion chamber 15 is obtained so that an efficient formation and propagation of the shock wave is reached. The inflator shown here can be used, for example, for inflating especially an airbag, and/or in a belt tensioner system.

It is further possible that in the inflator 10 inside the gas supply chamber 16 an additional fuel not shown is accommodated for re-supplying hot gas.

In FIG. 2 a possible embodiment of a bursting diaphragm 14 is illustrated. The bursting diaphragm 14 substantially has the shape of a cap including a flat lid 23. The outer contour 26 of the bursting diaphragm 14 is first formed by a cylindrical circumferential wall 20 as well as a beveling 21. Another segment of the outer contour or of the shell surface or of the entire circumferential wall is adjacent to the beveling 21. This is the frusto-conical circumferential wall 22 to which the flat lid 23 is connected.

As illustrated in FIG. 1, the combustion chamber screen 18 is located completely inside the bursting diaphragm 14, the combustion chamber screen 18 being adjacent to the inside of the beveling 21. The bulges of the bursting diaphragm 14 and of the combustion chamber screen 18 are formed in opposite direction.

In the lid 23 of the bursting diaphragm 14 a predetermined breaking contour 24 is incorporated. The predetermined breaking contour 24 is C-shaped according to the embodiment of FIG. 2. Moreover, there two through holes 25 are provided, wherein the through holes are formed on the end points 27 of the predetermined breaking contour 24. The areas of a geometric shape or line or arc-shaped contour are referred to as end points 27. The through holes 25 prevent bursting diaphragm parts from being separated upon opening or tearing the bursting diaphragm 14. In other words, the through holes 25 have a hinge or tear stop function. As already afore-mentioned, the through holes 25 allow cold gas to pass upon filling the gas supply chamber 16 during production of an inflator. In the present case the through holes 25 are circular and have a diameter of 0.5 to 3.0 mm, especially of 1.0 to 2.5 mm, especially of 1.2 to 2.0 mm, especially of 1.4 mm.

The cross-section of the through hole 25 is sufficiently small so as to permit an increase in pressure in the combustion chamber 15 up to a specific bursting of the bursting diaphragm 14 in the case of operation, i.e. upon activation of the inflator.

The predetermined breaking contour is preferably formed by stampings and/or millings and/or notches and/or laser abrasions, the residual wall thickness in the area of the stampings, for example, exhibiting a smaller material thickness than the shell surface or outer contour 26 and the stampings in the non-activated state of the inflator not breaking through. The bursting pressure of the predetermined breaking contour 24 can be adjusted very accurately and in a reproducible manner by the number, length and depth of the stampings.

Upon activation of the inflator 10 the predetermined breaking contour 24 tears so that a relatively large opening is formed which preferably extends to more than half of the entire diameter of the housing 11.

FIG. 3 merely illustrates the lid 23 of a bursting diaphragm 14 and the top view thereof, respectively. The predetermined breaking contour 24 incorporated in the lid 23 is cross-shaped in the present case. The cross-shaped predetermined breaking contour 24 is formed by two perpendicular lines or predetermined breaking lines 28. The two predetermined breaking lines 28 have the same length and intersect in center. Through holes 25 are formed on the end points 27 of the two predetermined breaking lines 28.

The diameters or cross-sections of the through holes 25 are equal. In other words, all through holes 25 of the bursting diaphragm 14 have the same opening width. When the four configured through holes 25 are connected a square is formed. In other words, the through holes 25 are the corner areas or corners of an imaginary square. Upon activation of the inflator and related destruction or opening of the predetermined breaking contour 24, the predetermined breaking lines 28 rupture so that triangular lid segments 29 are folding outwardly and thus form an opening in the lid 23. Consequently, this folding of the lid segments 29 forms a square or approximately square opening from which the shock wave is formed or introduced in the gas supply chamber 16 not shown here.

Figure 4:
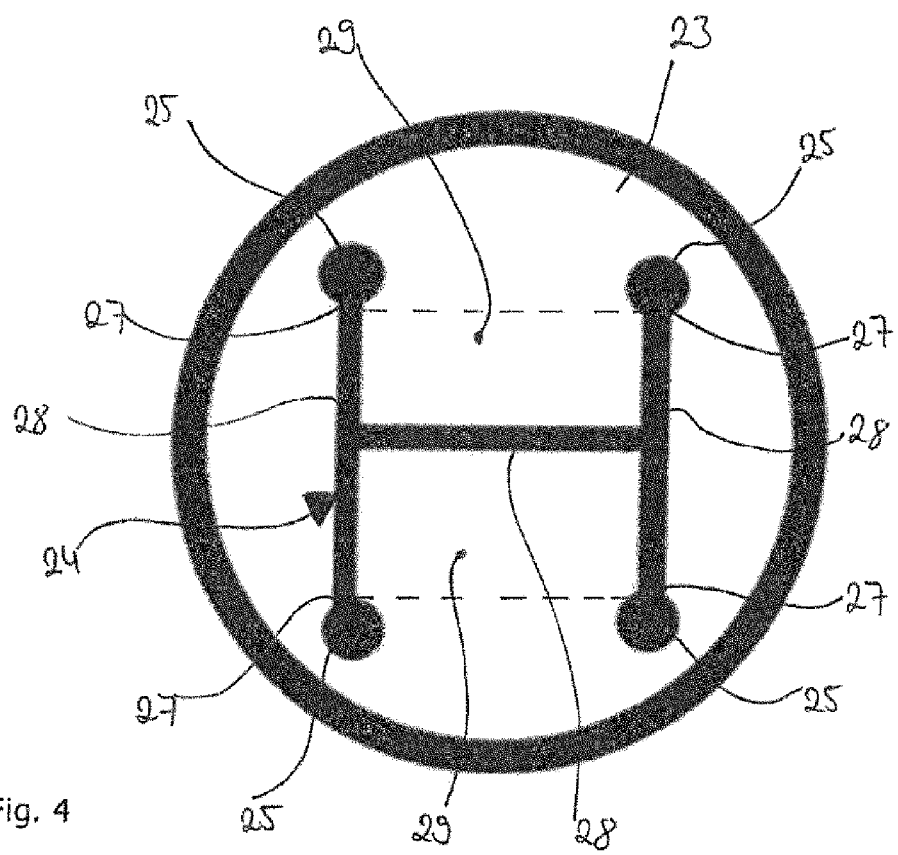

In FIG. 4, too, the lid 23 of a bursting diaphragm 14 and the top view thereof are shown. In the lid 23 a predetermined breaking contour 24 is incorporated. In the shown example the predetermined breaking contour 24 is formed of three predetermined breaking lines arranged in H shape. On the end points 27 of the predetermined breaking lines 28 arranged in parallel respective through holes 25 are formed. Also in this case, the through holes 25 are arranged relative to each other so that they form the corners of an imaginary square. By tearing or breaking the predetermined breaking lines 28 two rectangular lid segments 29 are bulged outwardly so that they in turn form an opening in the lid 23 of the bursting diaphragm 14.

Figure 5:
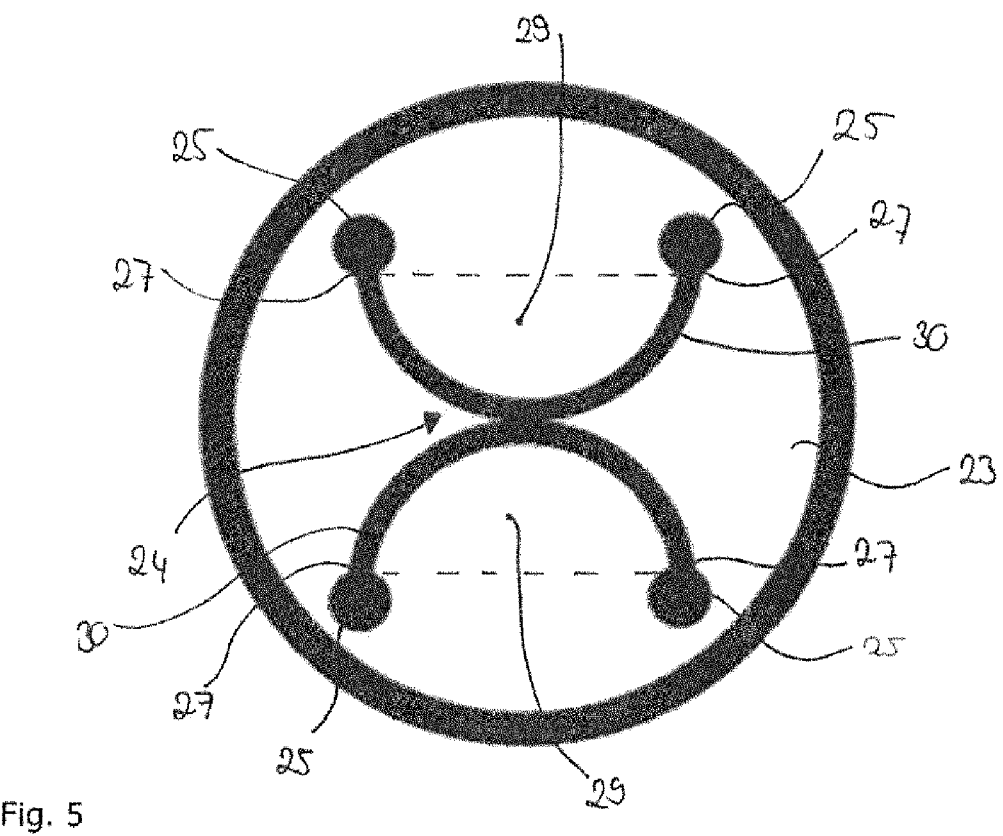

The predetermined breaking contour 24 formed in the lid 23 according to the embodiment of FIG. 5 is formed by two predetermined breaking arches 30. The predetermined breaking contour is thus formed in double C shape. The predetermined breaking arches 30 especially have a semicircular design. On the end points 27 of the two predetermined breaking arches 30 through holes 25 are formed which in turn constitute the corners of the square in an imaginary square. Upon activation of the inflator 10 or upon breaking of the predetermined breaking contour 24, two semicircular lid segments are outwardly bulged and form an enlarged opening in the bursting diaphragm 14.

The inflators, airbag modules and vehicle safety systems according to the invention are provided with bursting diaphragms 14 according to the invention in accordance with the embodiments illustrated in FIGS. 2 to 5.

LIST OF REFERENCE NUMERALS 10 inflator
11 housing
12 igniter
13 diffuser
14 bursting diaphragm
15 combustion chamber
16 gas supply chamber
17 notch
18 combustion chamber screen
19 bursting disk
20 cylindrical circumferential wall
21 beveling
22 frusto-conical circumferential wall
23 lid
24 predetermined breaking contour
25 through hole
26 outer contour
27 end point
28 predetermined breaking line
29 lid segment
30 predetermined breaking arch
L longitudinal inflator axis

The invention claimed is:

1. An inflator comprising:
an igniter unit;
a combustion chamber containing fuel, the fuel being ignitable by the igniter unit;
a gas supply chamber in fluid communication with the combustion chamber prior to activation of the inflator, the gas supply chamber containing pressurized gas prior to activation of the inflator; and
a bursting diaphragm disposed between the combustion chamber and the gas supply chamber, the bursting diaphragm separating the combustion chamber from the gas supply chamber and comprising:
at least one predetermined breaking contour destroyable upon activation of the inflator by a shockwave generated upon activation of the inflator; and
a through hole on at least one end point of the predetermined breaking contour, the through hole providing fluid communication between the combustion chamber and the gas supply chamber prior to activation of the inflator and prior to discharge of gas therefrom.

2. The inflator according to claim 1, wherein the predetermined breaking contour (24) is at least one of C-shaped, double C-shaped, H-shaped, T-shaped, star-shaped, circle segment-shaped, and cross-shaped.

3. The inflator according to claim 1, wherein the bursting diaphragm (14) has an outer contour (26) configured to be at least one of cap-shaped and semicircular.

4. The inflator according to claim 1, wherein the through hole (25) has a circular shape.

5. The inflator according to claim 1, wherein the through hole (25) has a width of 0.5 to 3.0 mm.

6. The inflator according to claim 1, wherein the predetermined breaking contour (24) is formed by at least one of stampings, millings, notches, and laser abrasions.

7. The inflator according to claim 1, wherein the bursting diaphragm (14) is connected to an external housing (11) of the inflator (10) by at least one of material connection and form-fit.

8. The inflator according to claim 1, wherein the through hole (25) has at least an opening width so that for producing the inflator upon filling the inflator (10) with gas, pressure compensation takes place between the gas supply chamber (16) and the combustion chamber (15) in less than 15 seconds.

9. The inflator according to claim 1, wherein the through hole (25) is configured so that upon activation of the inflator (10) an increase in pressure occurs in the combustion chamber (15) so as to cause the bursting diaphragm (14) to open.

10. The inflator according to claim 1, wherein inside the gas supply chamber (16) additional fuel is accommodated for re-supplying hot gas.

11. An airbag module comprising the inflator (10) according to claim 1.

12. The inflator according to claim 1, wherein the predetermined breaking contour has a through hole on all end points.

13. The inflator according to claim 1, wherein the through hole has a diameter of about 1.4 mm.

14. The inflator according to claim 1, wherein the through hole is disposed at a radially outward most end of the breaking contour.

15. The inflator of claim 1, wherein the through hole is configured to have at least one of a hinge function and a tear stop function.

16. An inflator comprising:
an igniter unit;
a combustion chamber containing fuel, the fuel being ignitable by the igniter unit;
a gas supply chamber in fluid communication with the combustion chamber prior to activation of the inflator, the gas supply chamber containing pressurized gas prior to activation of the inflator; and
a bursting diaphragm spaced apart from the igniter unit and disposed between the combustion chamber and the gas supply chamber, the bursting diaphragm separating the combustion chamber from the gas supply chamber and comprising:
at least one predetermined breaking contour destroyable upon activation of the inflator by a shockwave generated upon activation of the inflator; and
a through hole on at least one end point of the predetermined breaking contour, the through hole providing fluid communication between the combustion chamber and the gas supply chamber prior to activation of the inflator.

17. The inflator according to claim 16, wherein the through hole (25) has at least an opening width so that for producing the inflator upon filling the inflator (10) with gas, pressure compensation takes place between the gas supply chamber (16) and the combustion chamber (15) in less than 15 seconds.

18. The inflator according to claim 16, wherein the through hole (25) is configured so that upon activation of the inflator (10) an increase in pressure occurs in the combustion chamber (15) so as to cause the bursting diaphragm (14) to open.

19. An inflator comprising:
an igniter unit;
a combustion chamber containing fuel, the fuel being ignitable by the igniter unit;
a gas supply chamber in fluid communication with the combustion chamber, the gas supply chamber and the combustion chamber defining a sealed and pressurized vessel; and
a bursting diaphragm disposed in the sealed and pressurized vessel between the gas supply chamber and the combustion chamber, the bursting diaphragm comprising a through hole providing the fluid communication between the gas supply chamber and the combustion chamber, the bursting diaphragm further comprising at least one predetermined breaking contour that is destroyable upon activation of the inflator, the destruction of the at least one predetermined breaking contour generating a shockwave, wherein the through hole is located on at least one end point of the predetermined breaking contour.

* * * * *